(12) United States Patent
Baron et al.

(10) Patent No.: US 8,013,900 B2
(45) Date of Patent: Sep. 6, 2011

(54) METHOD AND APPARATUS FOR CAMERA SHAKE COMPENSATION

(75) Inventors: Natan Baron, Ranana (IL); Valadimir Koifman, Ranana (IL)

(73) Assignee: Advasense Technologies Ltd., Raanana (IL)

( * ) Notice: Subject to any disclaimer, the term of this patent is extended or adjusted under 35 U.S.C. 154(b) by 993 days.

(21) Appl. No.: 10/566,920

(22) PCT Filed: Nov. 17, 2004

(86) PCT No.: PCT/IL2004/001054
§ 371 (c)(1),
(2), (4) Date: Jan. 9, 2007

(87) PCT Pub. No.: WO2005/057902
PCT Pub. Date: Jun. 23, 2005

(65) Prior Publication Data
US 2007/0189604 A1    Aug. 16, 2007

Related U.S. Application Data

(60) Provisional application No. 60/528,510, filed on Dec. 11, 2003, provisional application No. 60/538,517, filed on Dec. 11, 2003.

(51) Int. Cl.
*H04N 5/228* (2006.01)
(52) U.S. Cl. ............... 348/222.1; 348/223.1; 348/224.1; 348/225.1; 348/226.1; 348/227.1

(58) Field of Classification Search .... 348/222.1–229.1, 348/362, 363; 382/167
See application file for complete search history.

(56) References Cited

U.S. PATENT DOCUMENTS 5,053,876 A * 10/1991 Blissett et al. ........... 348/208.14
5,313,296 A * 5/1994 Ohki ......................... 348/208.1

* cited by examiner

*Primary Examiner* — Yogesh K Aggarwal
(74) *Attorney, Agent, or Firm* — Reches Patents

(57) ABSTRACT

The invention provides a method for providing an image, the method includes: exposing a first group of pixels located at a first location to light, during an intermediate exposure period, to provide analog signals representative of the light; and transferring the analog signals to a second group of pixels located at a second location; whereas a relationship between the first and second locations is responsive to an estimated inter-image shift; then further exposure of the second group of pixels etc. The invention provides an apparatus for camera shake compensation, the apparatus includes: (i) a two dimensional array pixels, whereas multiple pixels of the array are adapted to receive light during an intermediate exposure period, and in response to provide analog signals representative of the light; and are further adapted to alter their condition in response to a reception of a right-back signals representative of previously received light; (ii) an analog memory, adapted to receive and store analog signals representative of light received a first group of pixels within the pixel array; and (iii) a write back circuitry, adapted to write back stored analog signals received from the first group to a second group of pixels located at a second location; whereas a relationship between the first and second locations is responsive to an estimated inter-image shift.

33 Claims, 6 Drawing Sheets

METHOD AND APPARATUS FOR CAMERA SHAKE COMPENSATION

CROSS REFERENCES TO RELATED APPLICATIONS

The present patent application is a national phase application of International Application No. PCT/IL2004/001054 filed Nov. 17, 2004, which claims priority benefit from U.S. Provisional Application 60/528,510 filed Dec. 11, 2003 and U.S. Provisional Application 60/538,517 filed Dec. 11, 2003.

FIELD OF THE INVENTION

The invention relates to a method and apparatus for camera shake compensation and especially for compensating shakes in a CMOS pixel array.

BACKGROUND OF THE INVENTION

Digital cameras include a two-dimensional pixel array. Each pixel includes a light sensitive elements that convert photons to an analog signal. The light sensitive elements can include photodiodes, phototransistors, photogates, hole accumulation diodes, pinned diodes, avalanche diodes, buried accumulation and transfer layer devices.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, titled "CMOS active pixel reset noise reduction"; U.S. Pat. No. 6,762,401 of Lee, titled "CMOS image sensor capable of increasing fill factor and driving method thereof"; U.S. Pat. No. 6,707,495 of Harada titled "solid-state imaging device and a method of reading a signal charge in a solid-state imaging device which can reduce smear and can provide an excellent image characteristics"; U.S. Pat. No. 6,750,912 of Tennant et al., titled "Active-passive imager pixel array with small groups of pixels having short common bus lines"; U.S. Pat. No. 6,697,111 of Kozlowski et al., titled "compact low-noise active pixel sensor with progressive row reset"; U.S. Pat. No. 6,665,013 of Fossum et al., titled "active pixel sensor having intra-pixel charge transfer with analog-to-digital converter"; U.S. Pat. No. 6,587,142 of Kozlowski et al., titled "low-noise active-pixel sensor for imaging arrays with high speed row reset"; U.S. Pat. No. 6,538,245 of Kozlowski, titled "amplified CMOS transducer for single photon read-out of photodetectors"; U.S. Pat. No. 6,532,040 of Kozlowski et al., titled "low-noise active-pixel sensor for imaging arrays with high-speed row reset"; U.S. Pat. No. 5,892,540 of Kozlowski et al., titled "low noise amplifier for passive pixel CMOS imager"; U.S. Pat. No. 6,438,276 of Dhuse et al., titled "imaging system having a sensor array reset noise reduction mechanism" and U.S. Pat. No. 6,326,230 of Pain et al., titled "high speed CMOS imager with motion artifact suppression and anti-blooming".

Each pixel provides an analog signal in response to light that interacts with the light sensitive element. Due to various reasons each pixel has to receive at least a minimal amount of photons in order to provide a reasonable analog signal. This minimal amount of photons dictates an exposure period that is inversely proportional to the light intensity. In other words, smaller amounts of light result in longer exposure periods.

Relative movement between an object and the pixel array can result from movements of the object or from movement of the camera. The latter can increase as the size of cameras, especially cameras that are integrated in mobile devices such as cellular phones, decreases. This relative movement is known as camera shake.

This relative movement can cause unwanted effects such as picture blur, especially when the exposure period is not short enough in relation to that relative movement. Typically, if during the exposure period the image moves by a distance that exceeds about a half of a pixel the acquired picture is regarded as blurred.

Various method and systems for compensating for camera shake are known in the art. They usually include altering an optical characteristic of the camera, moving a certain lens and the like.

High cost telescopes compensate for air turbulence induced image errors by a costly mechanism that includes dividing an exposure period to provide multiple snapshots that are digitally stored in large memory arrays and are added to each other in complex digital circuits that include large external memories (as multiple image, each including many pixels, has to be stored), very fast buses and complex signal processing logic. It is further noted that the transmission of high-speed signals over fast buses can result in RFI problems.

There is a need to provide an efficient method and apparatus for compensating for camera shake.

SUMMARY OF THE INVENTION

The invention provides a method for camera shake compensation, the method includes: (i) exposing a first group of pixels located at a first location to light, during an intermediate exposure period, to provide analog signals representative of the light; (ii) shifting the analog signals to a second group of pixels located at a second location; whereas a relationship between the first and second locations is responsive to an estimated inter-image shift. According to an embodiment of the invention the method further includes storing the analog signals before said shifting. Conveniently, the pixels are stored in an analog memory.

The invention provides a pixel that includes: (i) a light sensitive element adapted to provide an analog signal in response to received light; and (ii) a first component adapted to receive a write-back signal representative of previously received light and to alter a condition of the light sensitive element in response to the write-back signal.

The invention provides an apparatus for camera shake compensation, the apparatus includes: (i) a first group of pixels located at a first location, adapted to receive light during an intermediate exposure period, and in response to provide analog signals representative of the light; (ii) an analog memory, adapted to store the analog signals; and (iii) a write back circuitry, adapted to write back the stored analog signals to a second group of pixels located at a second location; whereas a relationship between the first and second locations is responsive to an estimated inter-image shift.

The invention provides an apparatus for camera shake compensation, the apparatus includes: (i) a two dimensional array pixels, whereas multiple pixels of the array are adapted to receive light during an intermediate exposure period, and in response to provide analog signals representative of the light; and whereas the multiple pixels are further adapted to alter their condition in response to a reception of a right-back signals representative of previously received light; (ii) an analog memory, adapted to receive and store analog signals representative of light received a first group of pixels within the pixel array; and (iii) a write back circuitry, adapted to write back the stored analog signals to a second group of pixels located at a second location; whereas a relationship between the first and second locations is responsive to an estimated inter-image shift.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The invention provide an apparatus and method for receiving an analog signal representative of received light by a certain pixel, and shifting it to another pixel. One of the embodiments of invention includes reading the pixel, storing it to an analog memory and writing it back to another pixel It is noted that the analog signal generated by the light sensitive element can be converted, altered, amplified and the like during the read out, storage and write back operation. These modifications and/or alterations still provide an analog signal representative of the received light. For simplicity of explanation the analog signal that undergoes this stages is referred to as analog signal.

The invention provides a method that includes: (i) exposing a first group of pixels located at a first location to light, during an intermediate exposure period, to provide analog signals representative of the light; and (ii) transferring the analog signals to a second group of pixels located at a second location; whereas a relationship between the first and second locations is responsive to an estimated inter-image shift.

Figure 1:
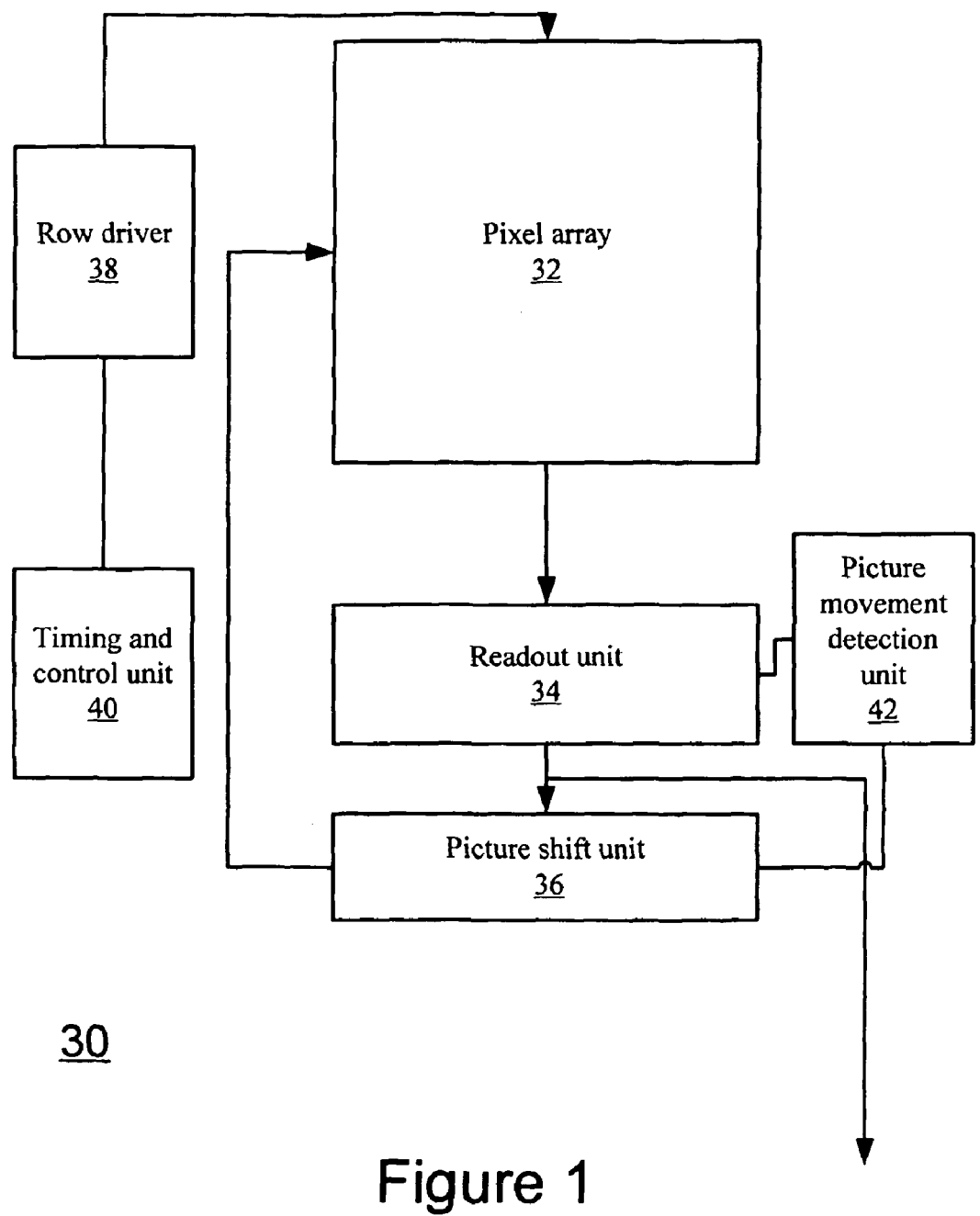
FIG. 1 is a schematic diagram of an apparatus for camera shake compensation, according to an embodiment of the invention.

FIG. 1 is a schematic diagram of an apparatus 30 for camera shake compensation, according to an embodiment of the invention.

According to an embodiment of the invention apparatus 30 of FIG. 1 as well other apparatuses described in this patent application, are capable of performing rotation operations, but said rotation usually requires relatively large analog memory.

Apparatus 30 includes a picture movement detection unit 42, a write back circuitry that includes a picture shift unit 36 and readout unit 34, timing and control unit 40 and a row driver 38. The pixel array 32 is connected to row driver 38, to readout unit 34 and to the picture shift unit 36. The picture shift unit 36 is also connected to the timing and control unit 40, to the picture movement detection unit 42 and to the readout unit 34, and also provides an output interface to apparatus 30. A picture acquired by apparatus 30 can be outputted via this output interface. The picture shift unit 36 may include an analog memory or may be connected to an analog memory.

The picture movement detection unit 42 is capable of estimating the relative movement between the pixel array and at least one object within the image acquired by the pixel array. The picture movement detection unit 42 can apply well-known algorithms for determining said movement. Conveniently, the picture movement detection unit 42 receives multiple output signals of the apparatus 30, usually multiple images and processes them to determine previous movement and estimate future movement. Picture movement detection unit 42 can determine the direction of that movement and its speed. Conveniently, the estimated movement is translated to an X axis and Y axis estimated movement components. These components are used to compensate for camera shake by determining which pixels shall receive the analog signal generated by other pixels.

The pixel array 32 is controlled such as to provide multiple intermediate images. Once a certain intermediate image is acquired it (or portions of said intermediate image) is sent to picture shift unit 36, via readout unit 34, to be temporarily stored and to be provided (conveniently during a write-back stage) to pixels in a manner that is responsive to the estimated movement.

The apparatus 30 facilitates long aggregate integration periods that include multiple short intermediate exposure periods. By shifting analog signals representative of pervious intermediate images the apparatus 30 allows to provide sharp images even in low ambient light conditions.

Pixel array 32 includes multiple pixels. These pixels can be prior art pixels, such as those illustrated by the previously mentioned patents, but this is not necessarily so. For example, a pixel can include a light sensitive element (such as a photodiode, photo-gate or a phototransistor) that generates an analog signal in response to received light, as well as additional components, connected to the light sensitive element, that read that analog signal (for example by sensing voltage, current and the like) and send it to other components such as readout unit 34. The pixel is also capable to receive analog signals representative of a previous intermediate exposure period. These signals may be also referred to as write-back signals and the process of providing these signals to the pixels may be also referred to as a write-back process. Each write-back operation integrates new light information with previously acquired information resulting in an overall long aggregate integration period. The reception of a write back signal alter a condition of the pixel and especially a condition of the light sensitive element such as to reflect previous reception of light from other pixels.

The row driver 38 provides strobe signals to the pixel array 32 enabling read and write operation according to the timing provided by the timing and control unit 40. The readout unit 34 retrieves analog signals representative of the signals generated by the light sensitive elements of the pixels and may include analog and digital components. It may include amplifiers, noise reduction circuitry, analog to digital converters and the like.

The picture shift unit 36 stores analog signals that represent the light received by the pixels, shifts it according to the estimated motion (also referred to inter-image shift) and sends it, either directly or via the readout unit 34, back to the pixel array 32.

Figure 2:
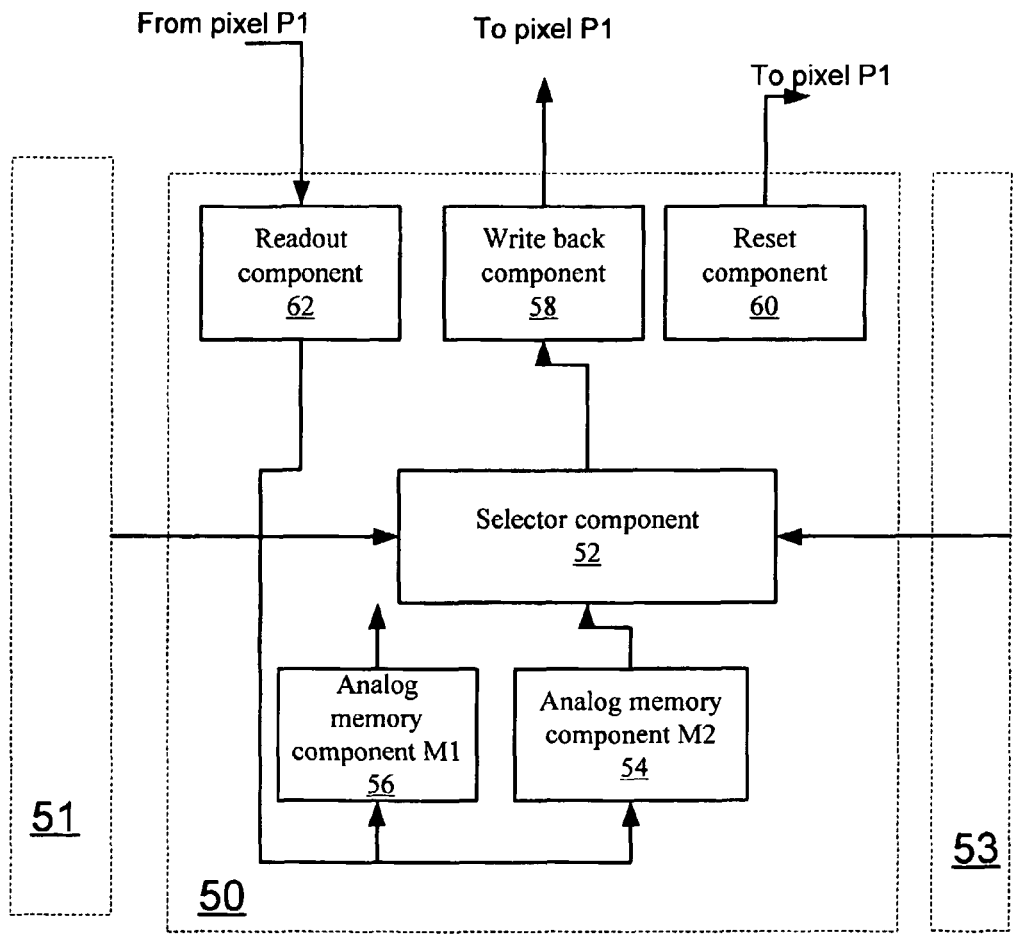
FIG. 2 is a schematic illustration of a cell of the picture shift unit, according to an embodiment of the invention.

FIG. 2 is a schematic illustration of a cell 50 of the picture shift unit 36, according to an embodiment of the invention. Each cell is selectively connected to a pixel that belongs to a certain column. Cell 50 is connected to pixel P1.

Cell 50 includes a selector component 52 as well as one or more memory components such as M1 54 and M2 56. The selector component can be connected to memory components of other cells. By selecting which memory component to connect to pixel P1 cell 50 performs an X-axis shift operation. The selector component 52 is connected to write back component 58 that is capable of providing the analog signal stored within the selected memory component to pixel P1. Pixel P1 is also connected to a reset component 60 capable of providing a reset signal to pixel P1, and is also connected to a readout component 62 capable of reading the content of pixel P1. Cell 50 is a part of a multiple cell arrangement that forms the picture shift unit 36. For example, cell 50 is placed between two identical cells 51 and 53 that are connected to pixels P0 and P2 that are adjacent to pixel P1.

Figure 3:
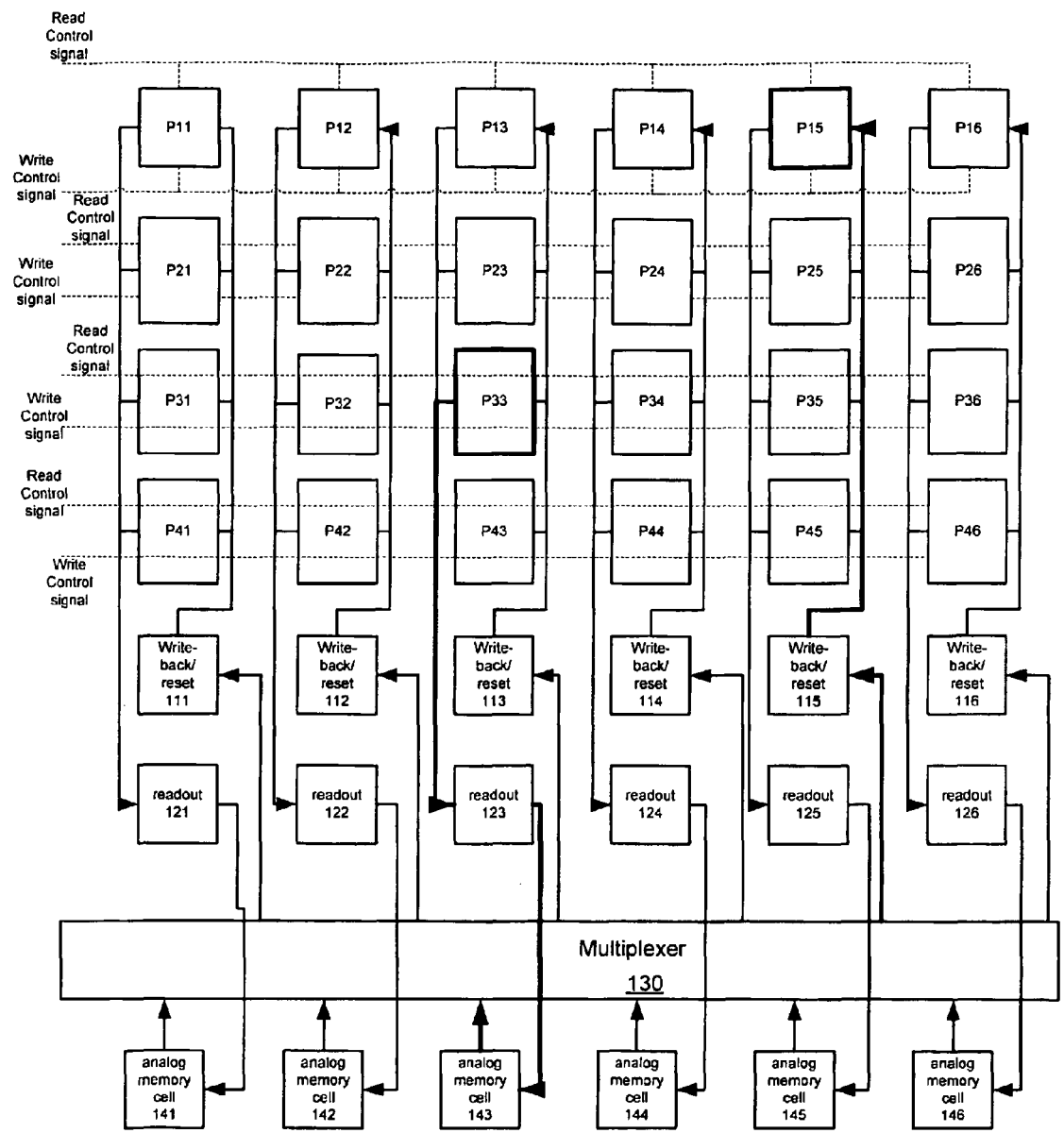
FIG. 3 is a schematic illustration of a cell of a picture shift unit, according to an embodiment of the invention.

FIG. 3 is a schematic diagram of a portion 100 of an apparatus 10' for camera shake compensation, according to an embodiment of the invention.

Portion 100 includes 4×6 pixels denoted P11-P46, each adapted to receive a read control signal, a reset/write-back control signal, a reset signal or a write back signal and to output an output analog signal.

A first column of pixels P11-P41 is connected to a first write-back/reset component 111 and to a first readout component 121. A second column of pixels P12-P42 is connected to a second write-back/reset component 112 and to a second readout component 122. A third column of pixels P13-P43 is connected to a third write-back/reset component 113 and to a third read-out component 123. A forth column of pixels P14-P44 is connected to a forth write-back/reset component 114 and to a forth readout component 124. A fifth column of pixels P15-P45 is connected to a fifth write-back/reset component 115 and to a fifth readout component 125. A sixth column of pixels P16-P46 is connected to a sixth write-back/reset component 116 and to a sixth readout component 126.

The write-back/reset components 111-116 are connected to analog memory components 141-146. The analog memory components 141-146 are connected to a multiplexer 130 that determines to which readout components to connect said analog memory components 141-146. For example, if the X axis estimated movement component is zero then analog memory components 141-146 are connected to write-back/reset components 111-116. If, for example, the X axis estimated movement component is two pixels to the right then the analog memory components 141-146 are connected via multiplexer 130 to write-back/reset components 113-118.

The pixels receive control signals on a row basis, such that a row of pixels outputs analog signals in parallel to the readout component 121-126.

The thick arrows illustrate a read operation from pixel P33 (actually the whole third row is read), to the third readout component 123 and the storage of that analog signal at a third analog memory component 143. The stored analog signal is sent, via multiplexer 130 to the fifth readout component 125, to the fifth write-back/reset component 115 to pixel P15. It is noted that the content of pixels P31-P36 is written to pixels P13-P18.

The analog memory components usually include two or more rows of memory cells. The amount of rows determines that amount of Y-axis movement compensation. The amount of rows can also be responsive to the configuration of the pixel array. A color pixel array usually requires more rows that a single light pixel array.

A typical color pixel array configuration includes a grid of color filters that are placed in a mosaic pattern over the pixels so that only one of red, green or blue light reaches any given pixel. The most common color filter pattern used in single pixel array cameras is the Bayer pattern. In this pattern the pixel array includes 50% green pixels, 25% red pixels and 25% blue pixels. The pixels are arranged such that one row include green pixels, each positioned between red pixels while an adjacent row includes green pixels, each positioned between blue pixels.

Write-back operations occur between pixels of the same color. Accordingly, using a color pixel array requires at least one additional row of memory cells in comparison to a single color pixel array.

Portion 100 operates in a rolling shutter mode. Thus, the rows (or columns) of the pixel array are read, reset or written back to on a row-to-row basis. In a typical pixel array that include hundreds of even more than a thousand rows, the duty cycle of each pixel row is very high and is limited by a relatively short reset, read or write-back operation. Conveniently, the determination of inter-pixel shift is executed during the read, reset or write back stages.

Figure 4:
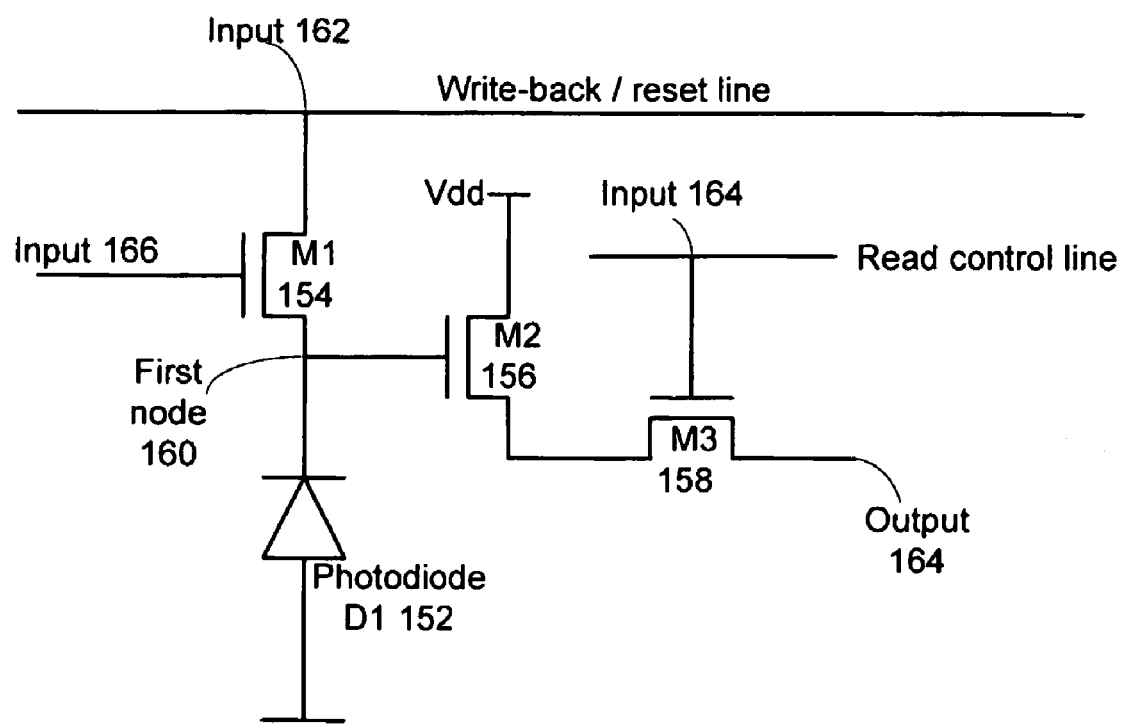
FIGS. 4 and 5 illustrate pixels according to various embodiments of the invention.

FIG. 4 illustrates pixel P11 150 according to an embodiment of the invention. It is assumed that pixel P11 is part of portion 100 of FIG. 5. Pixel P11 includes a light sensitive element (such as D1 152) adapted to provide an analog signal in response to received light; and a first component (such as transistor M1) adapted to receive a write-back signal representative of previously received light and to alter a condition of the light sensitive element in response to the write-back signal. Conveniently, pixel P11 also includes a second component (such as transistors M2 156 and M3 158), capable of providing an output signal representative of the analog signal.

Pixel P11 includes a photodiode D1 152 that converts light into a photocurrent. D1 152 is connected to a first node 160 of pixel P11. P11 also includes a reset transistor M1 154, a buffering transistor M2 156 and a read transistor M3 158. The gate of M1 154 is adapted to receive a reset control signal via reset control input 166 of P11. The drain of M1 154 is adapted to receive a reset signal or an analog signal from first write-back/reset component 111 via a write-back/reset input 162 of P11. The source of M1 154 is connected to the first node 160, as well as the gate of M2 156. The source of M2 156 is connected to the source of M3 158 while the drain of M2 156 is connected to supply source Vdd. The gate of M3 158 is adapted to receive a read control signal via read input 164 of P11. The drain of M3 158 provides an analog output signal of P11 via an output node 164 of P11. When a reset or write back control signal arrives to the gate of M1 154 the voltage of the first node 160 is set to the voltage provided to reset/write-back input 162 of P11 minus a small drain source voltage Vds of M1 154. When the gate of M3 158 receives a read control signal it provides as an output signal of P11 a voltage that equals Vfn-Vt2-Vsd3, whereas Vfn is the voltage level of the first node 160, Vt2 is a threshold voltage of M2 156 and Vsd3 is a source drain voltage of M3 158.

Figure 5:
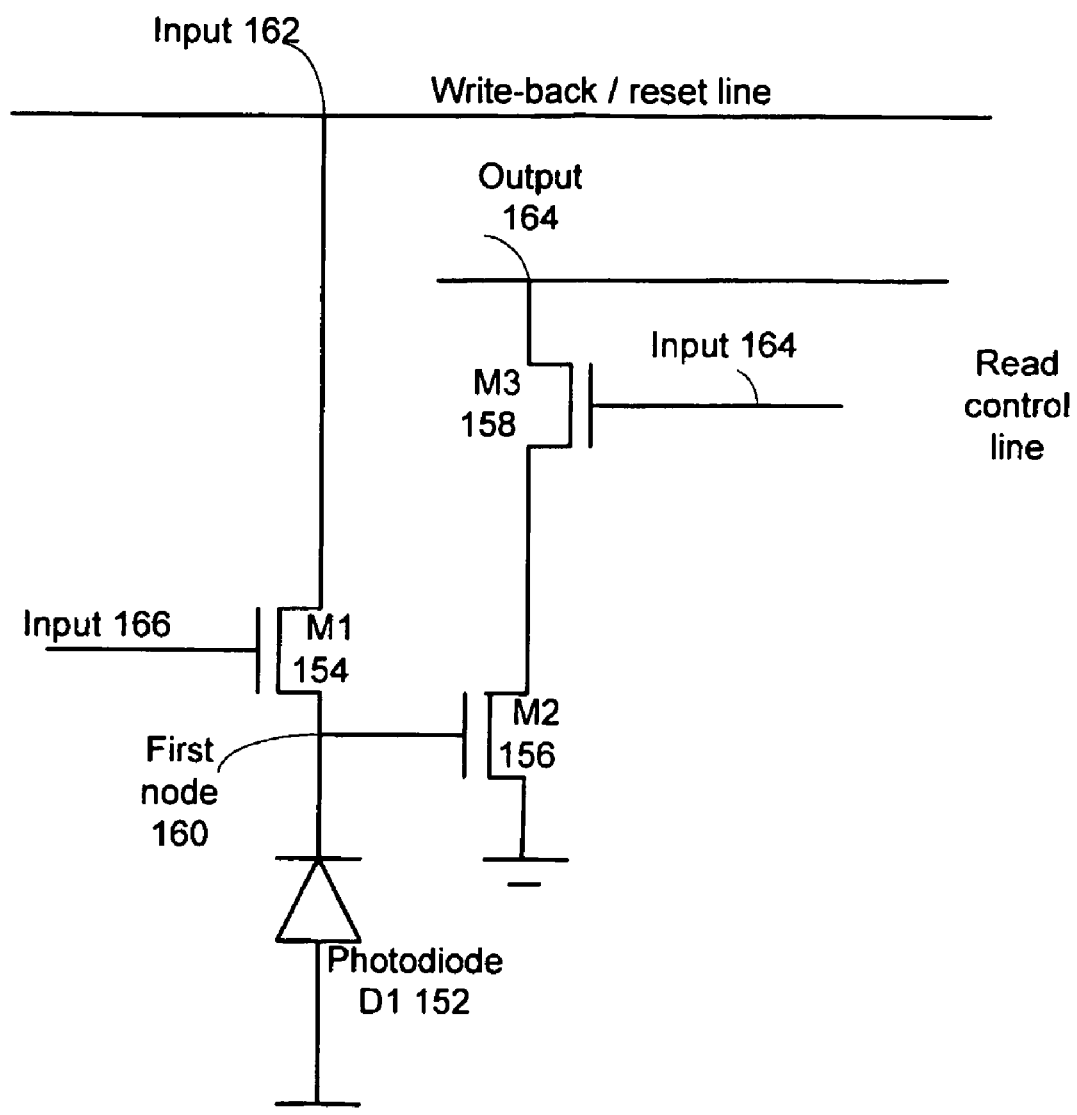

FIG. 5 illustrates pixel P12 151 according to another embodiment of the invention. Pixel P12 resembled pixel P11 but the source of M2 156 is grounded while the drain of M2 156 is connected to the drain of M2 156 is connected to the source of M3 158.

According to other embodiments of the invention pixels of other configuration can be used, including, for example, pixels of four transistors or pixels that are connected or selectively connected to feedback loops that include amplifiers or transistors for reducing thermal noise. The pixels can provide current that is representative of the received light.

Figure 6:
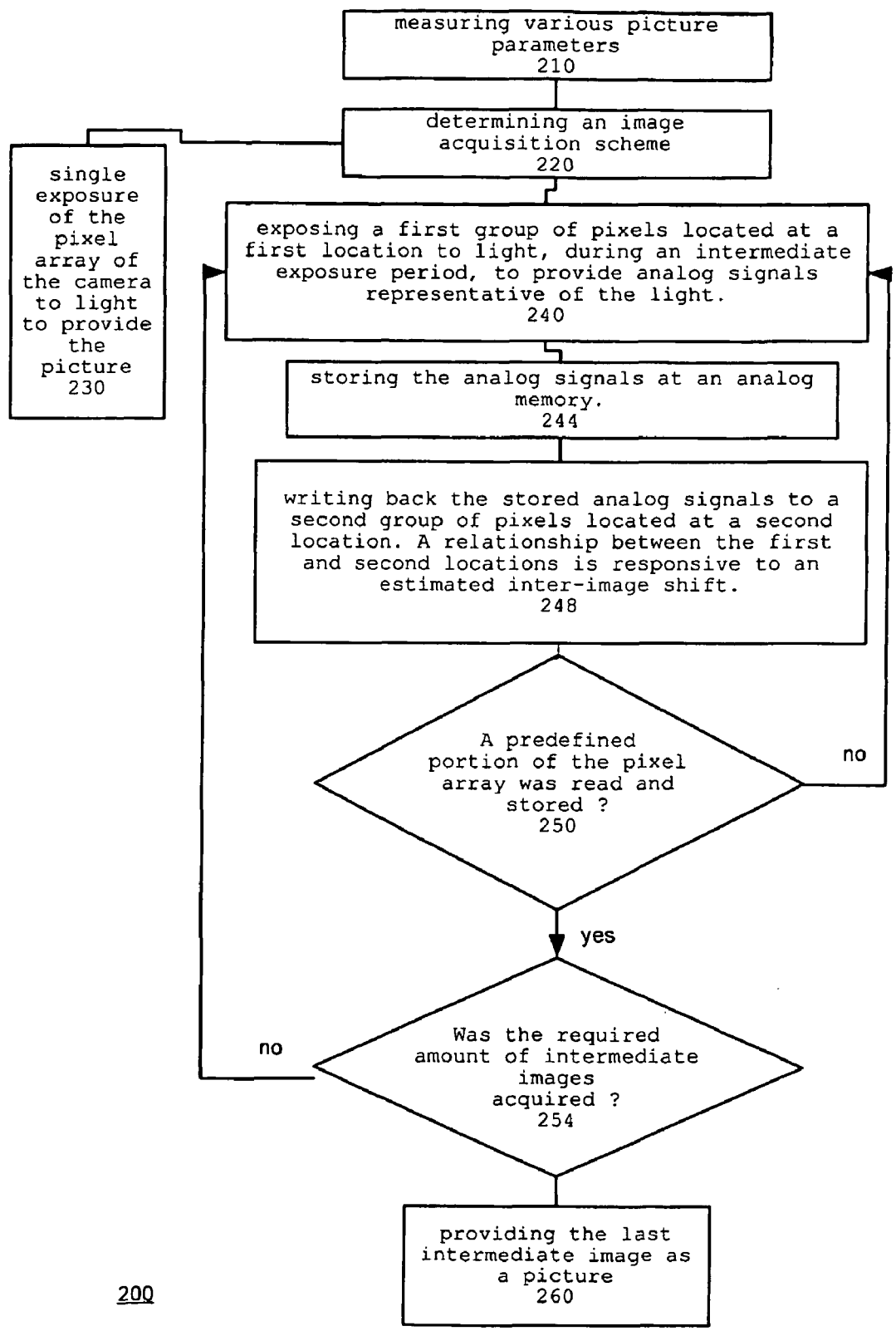
FIG. 6 is a flow chart illustrating a method for acquiring a picture, according to an embodiment of the invention.

FIG. 6 is a flow chart illustrating a method 100 for acquiring a picture, according to an embodiment of the invention.

Method 100 starts by stage 110 of measuring various picture parameters. These picture parameters may include an amount of ambient light, relative movement between a pixel array and an object, and the like.

There are various prior art methods for performing this stage. For example, the relative movement between the camera and an object can be measured by applying optical flow algorithms, block-matching algorithms, correlation based algorithms, Fourier Transform based algorithms, wavelet transform based algorithms. Some prior art algorithms process a full image, while others divide the image into a number of sub-images and analyze them separately. Some algorithms utilize small image areas of each image to determine the image movement. These small image areas are chosen according to various criteria, for example good or best contrast, color contrast, edges of objects, etc.

Stage 110 is followed by stage 120 of determining an image acquisition scheme. The determination is conveniently responsive to the amount of ambient light, a required aggregate exposure period and the relative movement.

The image acquisitions scheme can include a single shot, as illustrated by stage 130 that follows stage 120. A single shot means that the picture is acquired as a result of a single exposure of the pixel array of the camera to light.

The image acquisition scheme may include acquiring multiple intermediate images, as illustrated by stages 140-154 that follow stage 120. Each intermediate image is acquired during an intermediate exposure period. The length of the intermediate exposure period is selected to provide a sharp intermediate image. In other words, the intermediate exposure period is selected such that during that period the estimated relative movement will be below a predefined threshold (for example below 0.1 pixel). Conveniently, the intermediate exposure period is selected in response to the camera's limitations including its analog memory capacity (for example the amount of rows). Said limitation will be further discussed in relation to FIG. 4.

Stage 140 includes exposing a first group of pixels located at a first location to light, during an intermediate exposure period, to provide analog signals representative of the light.

Stage 140 is followed by stage 144 of storing the analog signals at an analog memory.

Stage 144 is followed by stage 148 of writing back the stored analog signals to a second group of pixels located at a second location. A relationship between the first and second locations is responsive to an estimated inter-image shift.

Stage 148 is followed by query 150 of determining if a predefined portion of the pixel array was read and stored. For example this question may include determining if all the rows of a pixel array were exposed to light and read. If the answer is negative stage 150 is followed by another sequence of stages 140-148 during which other pixels of the array are exposed to light and read.

If the answer is positive than an intermediate image was formed and stage 150 is followed by query stage 154 of determining if the required amount of intermediate images was acquired. If the answer is positive stage 154 is followed by stage 160 as providing the last intermediate image as a picture. It is noted that only a portion of said picture can be provided.

If the answer is negative then there is a need to provide additional intermediate images. In such a case stage 154 is followed by stage 140. It is noted that the method can include updating the movement estimate according to the currently acquired intermediate image.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:
1. A method for providing an image, comprising:
 exposing a first group of pixels located at a first location to light, during an intermediate exposure period, to provide analog signals representative of the light;
 storing the analog signals at an analog memory; and
 writing back the stored analog signals to a second group of pixels located at a second location; whereas a relationship between the first and second locations is responsive to an estimated inter-image shift;
 whereas the stage of exposing is preceded by a stage of determining the intermediate exposure period;
 wherein the intermediate exposure period is responsive to a capacity of the analog memory.
2. The method of claim 1 wherein the intermediate exposure period is responsive to the estimated inter-image shift.
3. The method of claim 1 wherein the stages of exposing, storing and writing back are repeated to provide a picture.
4. The method of claim 1 wherein multiple iterations of the stages of exposing, storing and writing back provide an intermediate image.
5. The method of claim 1 wherein the stages of stages of exposing, storing and writing back are repeated until multiple intermediate images are provided.
6. The method of claim 5 wherein an amount of intermediate images is responsive to an aggregate exposure period.
7. The method of claim 1 wherein the first group of pixels is a pixel row.
8. The method of claim 1 wherein the first group of pixels is a pixel column.
9. A method for updating a first pixel, the method comprises:
 exposing a second pixel located at a second location to light to provide an analog signal representative of the light;
 storing the analog signal at an analog memory; and
 writing back the stored analog signal to the first pixel located at a first location;
 whereas a relationship between the first and second locations is responsive to an estimated inter-image shift;
 whereas the stored analog signal differs from a reset signal.
10. The method of claim 9 wherein the first pixel differs from the second pixel.
11. The method of claim 9 wherein the first pixel equals the second pixel.
12. A pixel, comprising:
 a light sensitive element located at a first location to provide an analog signal in response to received light; and
 a first component adapted to receive a write-back signal at a second location representative of previously received light and to alter a condition of the light sensitive element in response to the write-back signal, whereas a relationship between the first and second location is responsive to an estimated inter-image shift;
 wherein the pixel further comprises a second component, capable of providing an output signal representative of the analog signal.
13. An apparatus for camera shake compensation, the apparatus comprising:
 a first group of pixels located at a first location, adapted to receive light during an intermediate exposure period, and in response to provide analog signals representative of the light;
 an analog memory, adapted to store the analog signals;
 a write back circuitry, adapted to write back the stored analog signals to a second group of pixels located at a second location; whereas a relationship between the first and second locations is responsive to an estimated inter-image shift;

wherein the apparatus is adapted to repeat an exposure of the first group of pixels to light, a storage of analog signals and a write-back of the analog signals to provide a picture.

14. The apparatus of claim 13 further comprising a controller adapted to control the operation of the write-back circuitry, analog memory and first and second group of pixels.

15. The apparatus of claim 13 further comprising a controller adapted to estimate the inter-image shift.

16. The apparatus of claim 15 whereas the controller is further adapted to determine the intermediate exposure period.

17. The apparatus of claim 16 wherein the intermediate exposure period is responsive to the estimated inter-image shift.

18. The apparatus of claim 16 wherein the intermediate exposure period is responsive to a capacity of the analog memory.

19. The apparatus of claim 13 wherein apparatus comprises an array of pixels that comprises at least the first and second groups of pixels.

20. The apparatus of claim 19 whereas the apparatus is adapted to repeat an exposure of different groups of pixels to light, storage of analog signals and a write-back of the analog signals such as to provide an intermediate image.

21. The apparatus of claim 19 whereas the apparatus is adapted to repeat an exposure of different groups of pixels to light, storage of analog signals and a write-back of the analog signals such as to provide multiple intermediate images.

22. The apparatus of claim 21 wherein an amount of intermediate images is responsive to an aggregate exposure period.

23. The apparatus of claim 13 wherein the first group of pixels is a pixel row.

24. The apparatus of claim 13 wherein the first group of pixels is a pixel column.

25. An apparatus for camera shake compensation, the apparatus comprising:

a two dimensional array pixels, whereas multiple pixels of the array are adapted to receive light during an intermediate exposure period, and in response to provide analog signals representative of the light; and are further adapted to alter their condition in response to a reception of a right-back signals representative of previously received light;

an analog memory, adapted to receive and store analog signals representative of light received a first group of pixels within the pixel array; and a write back circuitry, adapted to write back stored analog signals received from the first group to a second group of pixels located at a second location; whereas a relationship between the first and second locations is responsive to an estimated inter-image shift.

26. The apparatus of claim 25 whereas the first and second groups are pixel rows.

27. The apparatus of claim 25 whereas the first and second groups are pixel columns.

28. The apparatus of claim 25 adapted to repeat an exposure of various groups of pixels to light, a storage of analog signals and a write-back of the analog signals until a pre-defined portion of the pixel array receives write-back signals.

29. The apparatus of claim 25 wherein the apparatus is adapted to repeat an exposure of the first group of pixels to light, a storage of analog signals and a write-back of the analog signals to provide a picture.

30. The apparatus of claim 25 whereas the apparatus is adapted to repeat an exposure of different groups of pixels to light, storage of analog signals and a write-back of the analog signals such as to provide an intermediate image.

31. The apparatus of claim 25 whereas the apparatus is adapted to repeat an exposure of different groups of pixels to light, storage of analog signals and a write-back of the analog signals such as to provide multiple intermediate images.

32. A method for providing an image, comprising:

exposing a first group of pixels located at a first location to light, during an intermediate exposure period, to provide analog signals representative of the light;

transferring the analog signals to a second group of pixels located at a second location; whereas a relationship between the first and second locations is responsive to an estimated inter-image shift.

33. The method of claim 32 further comprising exposing the second group of pixels located at the second location to light, for further intermediate exposure period.

* * * * *